May 20, 1969 P. U. LIND 3,445,610

PUSHBUTTON DIALING MECHANISM

Filed Sept. 20, 1967 Sheet 1 of 2

INVENTOR.
PAUL U. LIND
BY
[signature]
AGENT 3,445,610
PUSHBUTTON DIALING MECHANISM
Paul U. Lind, Oak Park, Ill., assignor to Automatic Electric Laboratories, Inc., Northlake, Ill., a corporation of Delaware
Filed Sept. 20, 1967, Ser. No. 669,057
Int. Cl. H01h *9/26*
U.S. Cl. 200—5 12 Claims

ABSTRACT OF THE DISCLOSURE

A thin pushbutton dialing mechanism in which all of the switches and switch actuating elements, except the pushbuttons, lie in the same plane regardless of the depressed or restored condition of any pushbutton. Each of the pushbuttons of an array includes a cam surface which is operatively associated with a flat cam follower of a cam follower array which is slidably carried on a supporting base, each of the arrays being offset with respect to the coordinates of the other so that each cam contacts its cam follower at an angle to the coordinates of the follower array. Each of the switches are individually mounted on the supporting base along a pair of adjacent sides of the cam follower array and urges its respective row or column of cam followers in abutment with each other and in abutment with a raised edge of said supporting base on adjacent sides of said cam follower array opposite the switches. A pushbutton, upon depression, slides the associated cam follower at 45° to its array, which in turn slides the cam followers lying between it and the pair of switches associated with same column and row thereof sufficiently to operate the pair of switches.

The cam followers may be common washers, washers having an octagonal inner edge, an octagonal outer edge or solid, flat octagonal slugs.

*Background of the invention*

This invention relates to the pushbutton switch operating mechanism of multifrequency telephone dials, and is particularly concerned with decreasing the physical dimensions of the pushbutton telephone dial.

In the telephone industry there is a trend toward the introduction and use of smaller telephone instruments. For example, the bedroom-type instrument which has found wide acceptance is smaller than the desk instrument, and the new dial-in-handset instruments are somewhat smaller than the bedroom-type telephones. Additionally, the dial-in-handset instruments present a problem in packaging; namely, to house the dial and other electrical components in the telephone handset which is not so bulky, or too heavy, to be held with comfort.

One method of obtaining a smaller pushbutton dial is to miniaturize known dial mechanisms. There is a limit, however, to how much the dimensions of certain parts can be decreased and still retain the required strength and rigidity for extended operation. Then, too, smaller parts, especially those of complex configuration, require special handing and assembly techniques.

*Summary*

Briefly, the present invention provides a pushbutton telephone dial which employs a minimum of different types of parts which require little, if any, precision machining or casting. By utilizing essentially flat pieces, the present invention provides a construction of a pushbutton dial which is thin compared to present known constructions.

The generally thin construction referred to above may be realized by providing on a flat base plate a plurality of flat cam followers which are arranged in an array of columns and rows and which are constrained in abutting contact by two adjacent upstanding edges on said base plate and by resilient switch contacts individual to each column and row of cam followers which are mounted on said base plate on adjacent sides of the cam follower array which are opposite the two upstanding edges of said base plate. Each of the pushbuttons, which are also arranged in another coordinate array, is positioned at a 45° angle to the coordinates of the array of cam followers and includes a cam which is effective upon operation of the pushbutton to slidably displace the associated washer along a path which is at 45° to its coordinates. The cam follower so displaced in turn slides cam followers which lie between it and the switch contacts which are associated with its column and row to operate those contacts.

*Brief description of the drawings*

A better understanding of the invention, its construction and operation, may be had by referring to the drawings in which.

It should be noted that the drawings are greatly exaggerated so that the construction of the thin pushbutton dial may be shown in detail.

*Description of the preferred embodiment*

Figure 1:
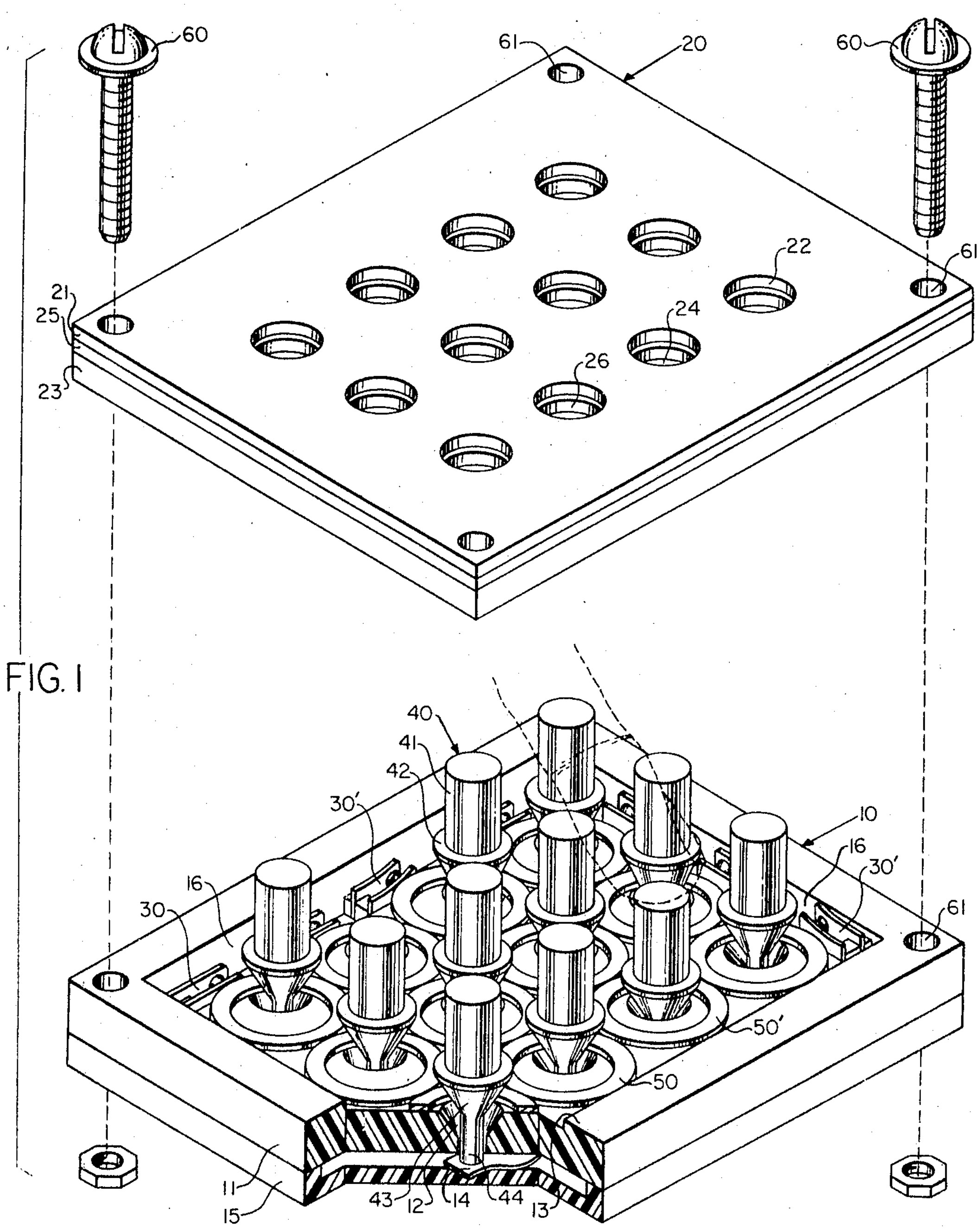
FIG. 1 is an exploded pictorial view of a pushbutton dial constructed in accordance with the invention.
Figure 2:
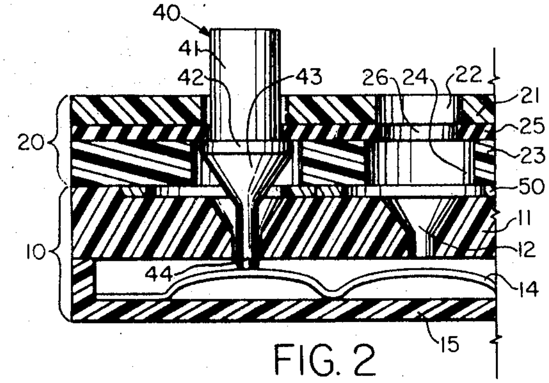
FIG. 2 is a fragmentary view of a section taken across two pushbutton positions of a dial of the present invention.

Referring to FIGS. 1 and 2, a pushbutton dial is shown comprising the base assembly 10, the cover assembly 20, a plurality of resilience switches 30, 30', a plurality of pushbuttons 40, and a plurality of cam followers, which are shown in this example as flat rings or washers 50.

Base assembly 10 includes a bottom plate 11 of electrically insulating material having a plurality of countersunk apertures 12 and a raised edge 13. Resilient switches 30 are mounted on this bottom guide plate onto adjacent sides of the array of washers and urge the array of washers in abutment with each other and against the raised edge 13 on the two opposite adjacent sides of the array. The array of countersunk apertures and the array of washers are positioned so that each washer is associated with a separate aperture but is not concentrically aligned therewith. It is preferable that such an offset of these two coordinate systems is at 45°. If it is desirable that the contacts of switches 30 be wider than the thickness of the cam followers, a well 16 may be provided in which the switches may be mounted. Additional restoring force for the pushbuttons may be provided by a spring 14 which is held in place by a spring and dust cover 15 which is also of electrically insulating material.

Each pushbutton comprises a finger and guide section 41, a collar 42, a conical cam 43 and a guide tip 44 and is also formed of an insulating material. In assembly of the dial mechanism each pushbutton is disposed in a separate countersunk aperture with its guide tip 44 extending past the conical portion of the countersunk aperture and its cam 43 contacting the inside edge of the associated washer. It will be noted here that when a pushbutton is depressed, cam 43 seats against the conical portion of its associated countersunk aperture.

Cover assembly 20 includes a top guide plate 21 of insulating material having a plurality of apertures 22 therein, a flexible insulating sheet 25 having a plurality of larger apertures 26 therein, and a plate 23 also of insulating material and having a plurality of still larger apertures 24 therein. The apertures 22, 24 and 26 are concentrically aligned and, when assembled to the base assembly, are also concentrically aligned with the countersunk apertures 12. This alignment of apertures in the cover assembly and base assembly provides for guiding of the pushbuttons as they are depressed and restored. Also when assembly 20 is mounted to base assembly 10 the pushbuttons extend through the cover assembly with the cam disposed in apertures 24, the collar abutting the flexible sheet 25 which prevents mechanical noises and seals the unit from dust, and finger and guide section 41 extending through apertures 22 and 26.

The pushbutton unit may be fastened together by any simple means, such as a machine screw 60 through aligned apertures 61 in plates 11, 15, 21, 23 and 25. If the pushbuttons are to be biased by springs 14, it may be advantageous to secure the pushbuttons and cam followers with the cover before the springs 14 and their holder 15 are assembled to the mechanism.

*Operation*

In this illustrative example the washers are positioned on guide plate 11 in a 3 x 4 coordinate array with springs 30 urging adjacent washers into contact with each other and the array in abutment with raised edge 13. As previously described, the centers of the washers are offset from the centers of the aligned apertures 12, 22, 24 and 26 of the base and cover assemblies which guide the pushbuttons; therefore, upon depression of a pushbutton (indicated in FIG. 1 by the finger shown in phantom) cam 43 actuates its cam follower, washer 50′, the prime (′) indicating operation, by sliding the washer 50′ at a 45° angle to the coordinates of the washer array. Washer 50′ in turn displaces washers of the same column and row which lie between it and the corresponding switches 30′ to operate the switches.

Figures 3, 5, 6, 7, 8, 9, 10:
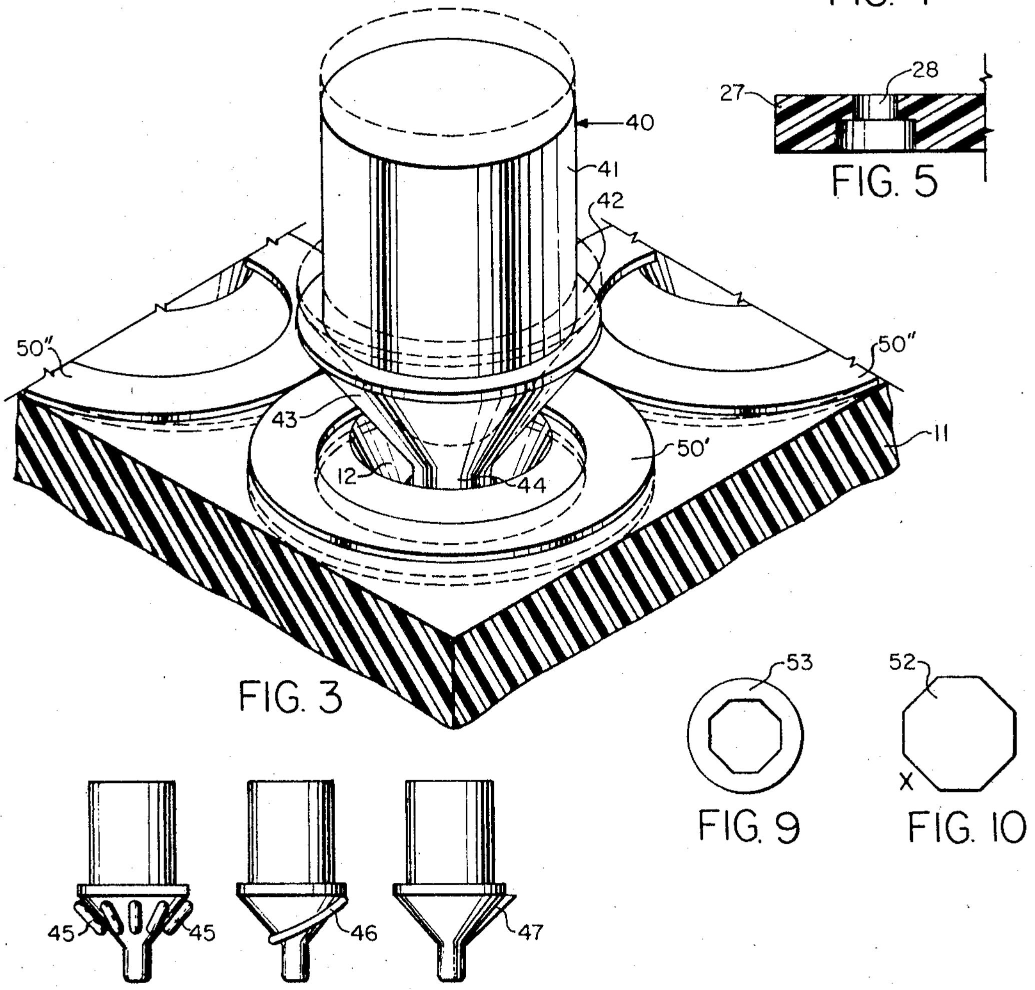
FIG. 3 is a partial fragmentary perspective view to illustrate the operation of a pushbutton.
FIG. 5 is a fragmentary section which shows an alternate construction of the cover plate of a pushbutton dial.
FIGS. 6, 7, and 8 show alternate pushbutton configurations.
FIGS. 9 and 10 show additional cam follower constructions.

Attention is invited to FIG. 3 for a more detailed inspection of the above operation. The broken lines indicate the positions of the pushbutton and washers before operation. Upon depression of pushbutton 40, cam 43 displaces washer 50′ at a 45° angle to the coordinates of the washer array. Washer 50′ in turn displaces washers 50″ along the coordinates of the washer array to operate the switches via the remainder of the washers which lie between washers 50′ and the switches.

*Alternate embodiments*

Figure 4:
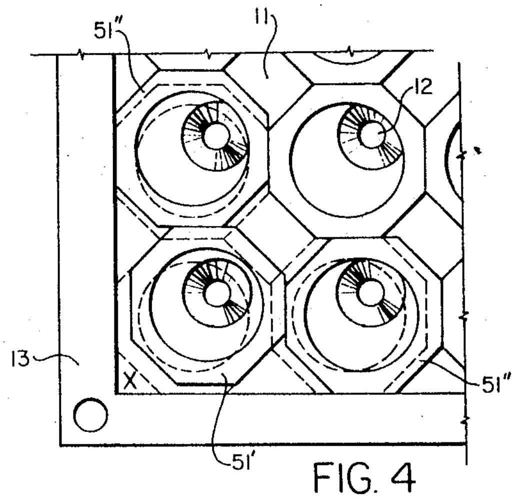
FIG. 4 is a partial plan view which shows an alternate cam follower configuration which may be employed in a pushbutton dial.

Attention is now directed to FIG. 4 which shows a base plate 11 having a raised edge 13 and a plurality of countersunk apertures 12 similar to that shown in FIG. 1. In FIG. 4, however, the cam followers take the form of washers having a circular inner edge and an octagonal outer edge. Of particular interest is the offset relationship between the center of the washers and the centers of the associated countersunk apertures which is shown in better detail in FIG. 4. Assuming that a pushbutton (not shown) associated with washer 51′ is depressed, it can be seen that the cam followers of FIG. 4 operate essentially as the cam followers of FIG. 1 in that actuated washer 51′ in turn slides washers 51″ to operate switches (not shown).

The pushbutton dial mechanism may be made slightly thinner than the mechanism described above for a given pushbutton length by providing a one-piece cover. FIG. 5 shows such a cover 27 having a plurality of counterbored apertures 28 to receive the finger guide, collar and cam of the pushbutton.

To decrease friction and accordingly decrease wear the pushbuttons may be provided with cams other than the conical cam described above. For example, the pushbutton of FIG. 6 has ribs 45 and the pushbutton of FIG. 7 has a rifling-type land 46 which would contact less of the edge of a washer than the above conical cam.

Referring back to FIG. 4 for a moment and assuming that the apertures 12 were offset in the opposite direction and positioned adjacent the outer octagonal edge of the washers (the reference $x$ symbolically representing the position of the aligned axes of the pushbutton and the apertures), a pushbutton having a flat cam surface could be advantageously employed. Such a pushbutton is shown in FIG. 8 having a wedge-shaped cam 47. Such a pushbutton configuration could also be advantageously employed in the just-described modification of FIG. 4 wherein the solid cam followers 52 of FIG. 10 are used, X again denoting the pushbutton and apertures axes. Reverting back to the offset actually shown in FIG. 4, the pushbutton of FIG. 8 could also be employed with the cam follower 53 shown in FIG. 9. In this case the width of the cam surface must be less than the length of one side of the octagon.

It should be understood that although the illustrated pushbutton mechanism is shown to have equal numbers of pushbuttons, countersunk apertures, cover assembly apertures and cam followers, lesser numbers ot pushbuttons and apertures may be employed in a pushbutton dial as long as the array of cam followers is complete. A prime example is the ten pushbutton telephone dial which would require twelve cam followers.

From the foregoing can be seen that the objectives of the invention have been realized in that a small, relatively thin pushbutton dial has been provided. Furthermore, it can be seen that the slimness of the dial is provided through the use of flat components which require little or no precision manufacturing steps and no cumbersome assembly techniques. Still further, in a given pushbutton mechanism, all of the cam followers are identical; thus, pluralities of parts for similarly functioning components are eliminated.

While the invention has been described by reference to specific illustrations, various modifications may be made by one skilled in the art without departing from the spirit and scope of the invention as defined in the appended claims.

What is claimed is:

1. A pushbutton dialing mechanism comprising a supporting member having a raised edge along first and second adjacent edges thereof and a first plurality of switches distributed along third and fourth edges thereof, said switches each having a resilient contact lying above the upper surface of said supporting member, a second plurality of similar flat annular washers slidably supported on said supporting member and arranged in rows parallel to said first edge and in columns parallel to said second edge, there being a switch contact at one end of each row and of each column, said washers being so dimensioned relative to said supporting member that the washers are normally constrained in abutting relationship with each other by said raised edge and the resilient contacts of said switches, said supporting member having a plurality of apertures therein arranged in a co-ordinate array which is offset from both the co-ordinate directions of the array defined by the washers, and a plurality of pushbuttons, each associated with a separate one of said washers, mounted for reciprocal movement in said apertures in a direction normal to said supporting member, each of said pushbuttons having a cam surface shaped to engage an edge of its associated washer upon depression of the pushbutton and operative to slide said associated washer and other ones of said washers located between it and the two switch contacts at the end of the column and row, respectively, of said associated washer sufficiently to operate said two switch contacts.

2. The pushbutton dialing mechanism of claim 1 wherein said washers are so dimensioned relative to said supporting member that the washers at the ends of each row respectively abut said second edge and a respective switch along said third edge and the washers in each row abut each other, and the washers at the ends of each column respectively abut said first edge and a respective switch along said fourth edge of the washers in each column abut each other.

3. The pushbutton dialing mechanism of claim 1, wherein said flat washers have an octagonal-shaped edge and wherein each of said pushbuttons includes a cam having a flat cam surface for contacting one side of the octagon of said edge.

4. The mechanism of claim 1, wherein each of said pushbuttons comprises first and second guide sections and a third section carrying said cam surface, and said supporting member comprises a flat base for carrying said washers, said base having a plurality of apertures therein for individually receiving said first guide sections, and cover apparatus affixed to said supporting member, said cover apparatus having a plurality of second apertures therein for individually receiving said second guide sections.

5. The mechanism of claim 4, wherein said cover apparatus comprises a top plate having said plurality of second apertures therein, a bottom plate having a like plurality of apertures therein aligned with said second apertures and a flexible sheet disposed between said top and bottom plates having a like plurality of apertures aligned with said second apertures and having edges which are in close proximity to the second guide sections of said pushbuttons.

6. The pushbutton dialing mechanism of claim 1, wherein each of said pushbuttons comprises a finger section, a guide section which extends through said supporting member and a cone-shaped cam between said finger and guide sections.

7. The pushbutton dialing mechanism of claim 6 wherein said cone-shaped cam includes at least one rib on the conical surface thereof.

8. The pushbutton dialing mechanism of claim 6 wherein said cone-shaped cam includes a rifling-type land about the conical surface thereof.

9. A pushbutton switch operating mechanism comprising; a support; a plurality of flat washers slidably carried by said support in orthogonal columns and rows and in abutting relationship; a plurality of pushbuttons carried by said support, each of said pushbuttons including a cam; means for mounting each of said pushbuttons for reciprocal movement between two positions with its cam contacting the inside edge of a separate one of said washers at an angle to both said columns and said rows of washers; means for resiliently biasing each of said pushbuttons to a first of said two positions, each of said pushbuttons being operable to slide its associated washer in the angular direction of its cam-washer contact, and said associated washer being operable to slide the remainder of the washers of the same row and column which are along orthogonal components of said angular direction; and a plurality of resilient switches normally biasing said plurality of washers toward first positions and separately mounted and operated by the movement of the washers thereof.

10. A pushbutton switch operating mechanism comprising: a support; a plurality of flat washers slidably carried by said support in orthogonal columns and rows and in abutting relationship; a plurality of pushbuttons carried by said support, each of said pushbuttons including a cam; means for mounting each of said pushbuttons for reciprocal movement between two positions with its cam contacting the outside edge of a separate one of said washers at an angle to both said columns and said rows of washers; means for resiliently biasing each of said pushbuttons to a first of said two positions, each of said pushbuttons being operable to slide its associated washer in an angular direction of approximately 180° to its cam-washer contact, and said associated washer being operable to slide the remainder of the washers of the same row and column which are along orthogonal components of said angular direction; and a plurality of switches separately mounted on said frame adjacent each row and column of washers and operated by the movement of the washers thereof.

11. A selective switch actuating mechanism comprising: a base having a plurality of countersunk apertures therein and including a raised portion around the edge thereof; a plurality of flat rings slidably carried on said base in longitudinal and transverse rows and in abutting relationship, each of said rings being associated with a separate one of said countersunk apertures and the centers of said rings being offset from the centers of said countersunk apertures; a plurality of switches, each of said switches being mounted adjacent a separate one of said rows and operable in response to movement of the rings thereof; a plurality of pushbuttons in longitudinal and transverse rows corresponding to and offset from the rows of said rings, each of said pushbuttons being associated with a separate one of said rings and including a finger portion, a collar portion, a conical cam portion extending through and contacting its associated ring at an angle to the longitudinal and transverse rows of said associated ring, and a tip portion extending into a separate one of said countersunk apertures; and a cover attached to said base, said cover having a plurality of counterbored apertures axially aligned with said plurality of countersunk apertures, the finger portions and collar portions of said pushbuttons being received by separate ones of said counterbored apertures with the finger portions extending through said cover, each of said pushbuttons being operable to slide its associated ring in the direction of its cam-ring contact, and said associated ring sliding all rings of its longitudinal and transverse rows which lie between and the pair of switches associated with its longitudinal and transverse rows to operate said pair of switches.

12. A pushbutton dialing mechanism comprising: a first guide plate including a pair of adjacent raised edges and having a plurality of apertures therein arranged in columns and rows; a second guide plate having a like plurality of apertures therein aligned with the apertures in said first guide plate; a like plurality of washers slidably carried by said first guide plate and arranged in columns and rows which are offset from respective columns and rows of its apertures; a plurality of resilient switch means, said plurality of said switch means individually associated with said columns and rows of washers and mounted on said first guide plate adjacent said columns and said rows and normally urging the washers thereof in abutment with each other and the columns and rows against said raised edges; and a plurality of pushbuttons, each of said pushbuttons extending through a separate one of said apertures of said first guide plate, a separate washer and a separate one of said apertures of said second guide plate and including a cam surface in contact with the associated washer, and each of said pushbuttons being operable to slide its associated washer at an angle to said columns and rows, all washers of the same column and row of the associated washer and which are along coordinate components of said angle being slid by said associated washer to operate the switch means associated with the column and row of the associated washer.

References Cited

UNITED STATES PATENTS

| | | | |
|---|---|---|---|
| 3,120,584 | 2/1964 | Grunfelder et al. | 200—5 |
| 3,205,318 | 9/1965 | Bilek | 200—5 |
| 3,227,819 | 1/1966 | Winther | 200—5 |
| 3,355,558 | 11/1967 | Geese et al. | 200—5 |

FOREIGN PATENTS

| | | |
|---|---|---|
| 470,793 | 1/1951 | Canada. |
| 331,619 | 7/1930 | Great Britain. |

ROBERT S. MACON, *Primary Examiner.*

ROBERT A. VANDERHYE, *Assistant Examiner.*

U.S. Cl. X.R.

179—90.3; 200—159, 166